United States Patent [19]
Derleth et al.

[11] Patent Number: 5,676,845
[45] Date of Patent: Oct. 14, 1997

[54] PROCESS FOR CATALYTIC TREATMENT OF EFFLUENTS CONTAINING ORGANIC AND INORGANIC COMPOUNDS, PREFERABLY FROM EPICHLOROHYDRIN PRODUCTION

[75] Inventors: Helmut Derleth; Karl-Heinz Bretz, both of Nienburg; Gerhard Neuenfeldt, Estorf; Hubert Schindler, Uetze; Alfred Ottmann, Hanover, all of Germany

[73] Assignee: Solvay Deutschland GmbH, Hanover, Germany

[21] Appl. No.: 513,992

[22] PCT Filed: Mar. 1, 1994

[86] PCT No.: PCT/EP94/00586

§ 371 Date: Sep. 5, 1995

§ 102(e) Date: Sep. 5, 1995

[87] PCT Pub. No.: WO94/20423

PCT Pub. Date: Sep. 15, 1994

[30] Foreign Application Priority Data

Mar. 5, 1993 [DE] Germany ............ 43 06 875.8
Feb. 18, 1994 [DE] Germany ............ 44 05 202.2

[51] Int. Cl.$^6$ ................................................ C02F 1/70
[52] U.S. Cl. ................... 210/757; 210/908; 210/909
[58] Field of Search ............................ 210/757, 908, 210/909

[56] References Cited

U.S. PATENT DOCUMENTS

| | | | |
|---|---|---|---|
| 4,747,937 | 5/1988 | Hilfman et al. | 210/909 |
| 4,758,346 | 7/1988 | Johnson | 210/638 |
| 4,909,947 | 3/1990 | Johnson et al. | 210/737 |
| 4,990,266 | 2/1991 | Vorlop et al. | |
| 5,122,496 | 6/1992 | Vorlop et al. | |

FOREIGN PATENT DOCUMENTS

| | | |
|---|---|---|
| 2397231 | 2/1979 | France . |
| 359074 | 3/1990 | Germany . |
| 1584900 | 2/1981 | United Kingdom . |

*Primary Examiner*—Neil McCarthy
*Attorney, Agent, or Firm*—Evenson, McKeown, Edwards & Lenahan P.L.L.C.

[57] ABSTRACT

In a catalytic treatment process for effluents containing organic and inorganic compounds, a noble metal catalyst on a support is used. The support preferably is produced according to the sol-gel process.

17 Claims, No Drawings

PROCESS FOR CATALYTIC TREATMENT OF EFFLUENTS CONTAINING ORGANIC AND INORGANIC COMPOUNDS, PREFERABLY FROM EPICHLOROHYDRIN PRODUCTION

The invention relates to a catalytic treatment process for effluents, which contain particularly halogen-organic and optionally inorganic compounds, with the use of a noble metal catalyst on a support.

The known catalytic treatment processes for effluents, which contain halogen-organic, particularly chloro-organic compounds (AOX), use, for example, alkaline or alkaline earth metals or noble metals or noble metal compounds as a catalyst. Thus, it is known that the decomposition of the chloro-organic compounds contained in the effluent is very successful in the presence of platinum, palladium or rhodium, palladium having the highest activity. Further investigations have shown that the selection of the support material for the catalyst activity should not be underestimated. Thus, it is known that palladium on aluminum oxide as a support has a lower activity than palladium on carbon as a support.

It is an object of the invention to develop a treatment process for effluents with the use of a noble metal catalyst on a support which has an improved activity.

According to the invention, the object is achieved in that the effluent is treated in the presence of hydrogen on a noble metal catalyst on a support whose support material contains inorganic oxide and carbon. According to the invention, inorganic oxides are preferably oxides of aluminum, magnesium, zirconium, silicon, titanium, alone or combinations thereof. The catalyst support preferably contains silicon dioxide as the oxidic constituent. In a preferred variant, the oxide faction of the support amounts to at least 50% in weight, preferably 55 to 85% in weight.

The catalyst contains metals of the eighth subgroup of the Periodic Table of Elements, such as platinum, palladium iridium or rhodium, preferably palladium, alone or in combinations thereof, as the active constituent.

The effluent, particularly an effluent from the epichlorohydrin production, with a pH-value of 3 to 10, preferably 4 to 6, is introduced into at least one reactor in which the noble metal catalyst is situated on a support, and is treated with hydrogen at 5° to 80° C., preferably 10° to 30° C., and 1 to 10 bar.

The adjustment of the pH-value takes place in a manner known per se.

Thus, for example, before the treatment of an effluent from the epichlorohydrin production which normally has a pH-value of from 11 to 13, the pH-value of the effluent is adjusted to a value of $\geq 3$ or $\leq 10$ by the addition of an acid, preferably hydrochloric acid.

It was found to be expedient to carry out the treatment in an amount of hydrogen which corresponds at least to the stoichiometrically calculated amount of the AOX-content to be removed.

At a normal pressure and at temperatures between 10° C. and 25° C., the solubility of the hydrogen gas is below 1.7 mg/l and rises proportionally to the working pressure.

The decomposition output may vary according to the starting concentration of the chemical nature of the halogen-organic compounds, the pH-value, the hydrogen gas concentration or gasification rate and the temperature.

By means of a palladium support catalyst with 0.5 or 1% palladium, decomposition outputs of, for example, 0.5 to 4 mg AOX are achieved per hour and gram of catalyst.

The hydrogen may be charged into the effluent either by means of a direct introduction of hydrogen gas or by means of a membrane module.

Membranes of an integral-symmetrical construction and particularly compact membranes are particularly suitable. These membranes have a porous water-resistant support structure and at least one layer of a water-resistant non-porous polymer, the effluent to be gasified being guided past this layer. This non-porous layers consists, for example, of a silicone polymer.

Other methods, for example, by way of gas saturators, are also suitable for the charging of hydrogen.

The charging of hydrogen may take place either when the effluent comes in contact with the catalyst or it may take place separately. In a preferred variant, the charging of the hydrogen takes place before the effluent comes in contact with the catalyst.

In a preferred embodiment of the invention, a support is used on the basis of inorganic oxides which was produced according to the sol-gel process. For producing the support material, a liquid alkaline constituent is first combined with a liquid acid constituent to form a sol. In a manner which is known per se, this sol can be solidified to form shaped bodies, for example, by charging it into a forming oil bath. The solidified sol particles are then aged, washed, dried and calcined.

A sol in this case is an instable sol, which gels immediately after the bringing-together of the constituents, as well as a metastable sol which remains in the free-flowing condition for some time.

In a preferred variant, the sol-gel conversion takes place in that a sol is sprayed in such a manner from below into a reaction zone containing a reaction gas that the sol separates into individual sol beads immediately before entering or not before entering into the reaction zone, and the formed sol beads fly through the reaction zone on a curved flight path, during which they are presolidified, and the presolidified sol particles are then collected in a collecting device. By means of this method of operation, the location and the point in time of the sol bead formation are then advantageously coordinated with the beginning of the gelling (presolidification) of the sol beads. The sol beads, which at the point in time of their formation are still liquid sol drops of an almost ideal spherical shape and a largely identical spherical diameter, when flying through the reaction zone, are fixed in their almost ideal uniform spherical shape, that is, presolidified, so that they are largely protected from deformative effects before the sol beads, which are presolidified in their spherical shape are finally solidified to be stable by means of additional measures of the sol-gel process which are known per se. For this purpose, the spray-in device is arranged at a defined distance below the spray-in opening into the reaction zone, the distance corresponding to approximately the distance, starting out from the spraying apparatus, at which the sol tears open into sol beads. In addition, the sol is sprayed from the spraying apparatus from below, that is, against the force of gravity, at a defined angle $\alpha$, into the reaction zone, the angle $\alpha$, in this case, being formed of a horizontal axis situated perpendicularly to the force of gravity and the tangent of the sprayed sol at the outlet point from the spraying system.

According to the preferred process, a gellable sol is sprayed from below in the upward direction into the reaction zone, particularly at an angle $\alpha < 90°$ C. According to the particle size range, the used spraying apparatus may be syringes with hollow needles of different diameters or spraying nozzles, spraying wheels, ultrasonic nozzles, turbo-bells, mechanically driven nozzles or spraying systems which are known per se and which are used in electrostatic spraying or in jet printers (such as piezo-excited nozzles). In this case, the particle size range is varied by way of the used spraying apparatus. Therefore, in the case of a desired particle size in the range of from 0.01 to 0.3 mm, turbo-bells or spraying nozzles, for example, spiral nozzles which are know per se (such as spiral nozzles of Spraybest Co.) are expediently used or preferably ultrasonic nozzles. In the case of a desired particle size in the range of from 0.3 mm to 5 mm, particularly 0.3 mm to 3.5 mm, spray wheels are expediently used or preferably hollow needles of a corresponding diameter. In the case of a very short distance of the spraying apparatus from the inlet opening of the reaction zone containing the reaction gas, it may be expedient, for example, when spraying nozzles or hollow needles of a small diameter are used, to blow a flush gas (such as compressed air or water vapor) at the spraying apparatus in order to avoid a clogging of the spraying apparatus by prematurely gelling sol.

In this case, the sol may be present as an instable sol, which was obtained by the combining of two constituents, and as a self-gelling or metastable sol which is free-flowing for some time. This process is particularly suitable for the production of particles on the basis of inorganic oxides by a sol-gel conversion. In this case, inorganic oxides are particularly the oxides from the magnesium oxide, aluminum oxide, silicon dioxide, alumosilicate, zinc oxide, titanium dioxide, chromium oxide, copper oxide, manganese oxide, cerium oxide, tin oxide, iron oxide, nickel oxide, lead oxide, molybdenum oxide, vanadium oxide, thorium oxide, zirconium oxide and/or hafnium oxide group. Preferred oxides are alumosilicate, aluminum oxide and/or silicon dioxide. In this case, the term inorganic oxide comprises the above-mentioned metal oxides separately as well as mixed oxides, particularly binary or tertiary mixed oxides whose one constituent is silicon dioxide, aluminum oxide or alumosilicate. Inorganic oxides are also those oxides which, in addition to gel-forming oxidic constituents, contain additional admixtures which improve the application technology features and/or the catalytic features.

Particles composed of silicon dioxide are preferably produced according to this method of operation. Thus, for example, a sol containing silicon dioxide can be obtained in that an aqueous solution of an alkali metal silicate, such as a sodium silicate solution, as the alkaline constituent, is mixed in a known manner with the aqueous solution of an inorganic acid, such as an aqueous sulfuric acid or hydrochloric acid solution, or an organic acid, such as an aqueous formic acid or acetic acid solution. In this case, additional constituents, such as aluminum or magnesium compounds may be added to the alkaline as well as the acid constituent. In another variant, an instable sol may be obtained which contains silicon dioxide in that silicic acid alkyl ester with an alkaline constituent, such as NaOH, $NH_3$ or an acid constituent, such as hydrochloric acid, or silicon tetrachloride is reacted with an acid constituent, such as formic acid. Another possibility for producing particles containing silicon dioxide is the use of metastable silicious sol (for example, Bayer $S200^R$).

According to this process, sols may also be used which contain additional constituents in a homogeneous or heterogeneous form. As the heterogeneous constituents, they may contain, for example, fine fractions of any type, quantity and particle size known per se. For improving the application technology features, fillers, for example, may be added as fine fractions; for example, fillers from the silicic acid, alumosilicate, aluminum oxide, titanium dioxide, kaolin, montmorillonite, bentonite, zeolite, starch, wood dust or carbon group. These fillers may be added to the acid and/or alkaline constituent in a crystalline or amorphous form or in a fine-grained form, as described in German Patent Document DE 42 16 868. Fine fractions which change the catalytic features of the particles may be used in the conventional manner. Thus, for example, magnesium acetyl acetonate, zirconium acetyl acetonate, copper acetyl acetonate, lead acetyl acetonate or titanium acetyl acetonate may be added as homogeneous constituents. Within the scope of the invention, carbon is preferably used as an additive.

The mixing of the alkaline constituent with the acid constituent to form a gellable instable sol may be carried out in a manner known per se in any mixing apparatus, for example, a mixing nozzle, suitable for this purpose. Then, the thus obtained sol will be pumped directly into a spraying apparatus by means of which, according to the invention, it can be sprayed from below into the reaction gas.

By means of the spraying apparatus, the gellable sol is sprayed upwards from below at an angle alpha <90°, for example, an angle of 40° to 89°, preferably 80° to 88°, into the reaction zone in such a manner that, after leaving the spraying apparatus, it is torn up into sol beads of largely the same size only directly before or during the passing of the inlet opening into the reaction zone, in which case the sol beads are subjected at the moment of their formation virtually immediately to the gelling effect of the reaction gas. The disintegration of the sol into individual sol beads depends, in addition to the angle, on the viscosity of the sol, the respectively used spraying apparatus as well as the pressure at which the sol leaves the spraying apparatus. In order to adjust the point at which the sol tears into individual sol beads, the distance between the spraying apparatus and the inlet opening into the reaction zone is varied at the start of the spraying operation in such a manner by a person skilled in the art by means of an inspection—that is, the distance is reduced or optionally increased—until the tearing point of the sol into individual sol beads is situated directly in front of or inside the inlet opening into the reaction zone.

After the entry into the reaction zone, the formed sol beads fly along a flight path curved in the shape of a parabola through the reaction gas situated in the reaction zone, in which case they are fixed in their spherical shape, that is, they are presolidified. As a result of the fact that the sol beads must pass this parabola-shaped flight path through the reaction gas, according to this process, the reaction gas can contribute to the presolidification of the sol beads for a particularly long time which significantly minimizes the risk that the sol beads may deform when impacting on the collection device. In order to further reduce the risk of deformation, if desired, a collecting device whose height can be adjusted may be brought close to the reversal point of the parabola-shaped flight path of the sol beads at which the sol beads have their lowest kinetic energy.

A flat-stretched foil, such as a PVDF-foil or a polyethlene- or polyvinylchloride-foil or a collecting vessel filled with solid carbon dioxide or a collecting vessel filled with liquid may be used as the collecting device. In a variant of the process, a collecting vessel filled with solid $CO_2$ is preferably used. In this case, as a result of the Leidenforst phenomenon known with respect to solid carbon dioxide, the kinetic energy of the sol particles during the impact can be further reduced. Particularly preferred variants of the process use a collecting vessel filled with a liquid, particularly a reaction liquid, as the collecting device. Reaction liquids in this case are all conventional acid or alkaline liquids, as they are normally used for the aging of particles according to the sol-gel process. For this purpose, customary reaction liquids are, for example, an aqueous ammonia solution, such as a 5 to 10% aqueous ammonia solution, or acid reaction liquids, such as hydrochloric acid, sulfuric acid or nitric acid in concentrations of from 1 to 5% in weight. When using a reaction liquid, reaction gases should expediently used in the reaction zone which are equivalent to this reaction liquid. If, for example, an aqueous ammonia solution is used as the reaction fluid, ammonia gas or vapors of organic amines should be used as the reaction gas. When acid reaction fluids, such as hydrochloric acid, sulfuric acid or nitric acid are used, the acid reaction gases which are equivalent in this respect are to be used, such as hydrogen chloride, sulfur dioxide or nitrogen oxides.

The used reaction gas can easily be held in the reaction zone as a closed receptacle above the corresponding collection device. In this case, fresh reaction gas, as required, can be continuously refilled by a separate gas supply into the reaction zone. When self-gelling sols are used, in addition to the above-mentioned alkaline or acid reaction gases, inert gases, such as air or nitrogen, may also be used as reaction gases. Optionally, the presolidification of the sol particles when flying along the curved flight path through the reaction gas may be promoted by a heating of the reaction zone. For this purpose, the reaction zone is expediently heated to temperatures of up to 120° C., preferably 80° to 100° C. When a collection vessel is used as a collecting device which is filled with solid carbon dioxide, the reaction zone may also be cooled to temperatures below room temperature in order to promote the presolidification of the sol particles in this manner by reducing the viscosity.

From the collecting device, the presolidified sol particles may be fed to the processing, as normally carried out for particles produced according to the sol-gel process. This processing normally comprises the process steps of washing, drying and optional calcining. Thus, the sol particles are normally dried at temperatures in the range of from 100° to 200° C. for a period of 1 to 24 hours. In a variant, when a flat-stretched foil or a collection vessel filled with solid carbon dioxide is used as the collecting device, the presolidified sol particles may also directly, for example, by means of a suction device, be conveyed to a drying unit, such as a spray drying unit, which is known per se.

For producing particularly small particles, especially particles of a diameter in the range of from 0.001 mm to 0.3 mm, a modified apparatus is expediently used, in which case the spraying apparatus comprises a cloud chamber. In this variant of the process, small sol beads are produced by means of a nozzle, expediently a spiral nozzle or preferably an ultrasonic nozzle which fall downward in the cloud chamber and are taken in by a spraying apparatus, for example, a fan ventilator known from ventilating systems, and are then sprayed from below in the upward direction into the reaction zone containing the reaction gas. The further steps take place analogously.

In a further embodiment, the spherical particles obtained according to the above-mentioned variants of the process may also be subjected to a treatment with a low alkyl alcohol, particularly a $C_1$- to $C_4$-alcohol, such as methanol, ethanol, propanol or isopropanol or to a treatment with acetone, before they are conveyed to the drying unit after being collected in the collecting device. Isopropanol, which, if possible, should be anhydrous, is preferably used for this treatment. By means of the treatment with a low alkyl alcohol or acetone, on the one hand, a gluing-together of the obtained particles can advantageously be avoided, particularly of particles of an average diameter of less than 1 mm, during the drying; on the other hand, the pore volume of the obtained particles can be expanded by means of this treatment. For this purpose, the particles are transferred from the collecting device into a receptacle and a layer of alcohol is repeatedly added for a duration of 1 minute to 24 hours, expediently for 2 to 3 hours. Thus, by means of this treatment, for example, the pore volume may be changed in a targeted manner.

By means of the process according to the invention, it is advantageously possible to obtain particles composed of inorganic oxides with a very uniform spherical configuration, a narrow distribution of the pore diameters, as well as a very close grain spectrum. In this case, the occurrence of larger amounts of undersize or oversize grain can largely be avoided. A close grain spectrum is a grain spectrum in which 80% of the particles have a diameter within the range about the respective average diameter indicated in the following table ((normal distribution).

| Average Diameter of Particles in the range of [mm] | Grain Spectrum having 80% of the Particles about the Respective Average Diameter [mm] |
|---|---|
| 1.0–5.0 | ±1.0 |
| 0.1–1.0 | ±0.1 |
| 0.01–0.1 | ±0.02 |
| 0.001–0.01 | ±0.004 |

Advantageously, no forming oil has to be used so that the produced particles are also free of other contaminations or discolorations. Also in the case of particles produced according to this process, the pore volume can be advantageously expanded by means of a treatment with acetone or a low alkyl alcohol before the drying. In addition, the thus produced spherical particles exhibit a surprisingly high abrasion resistance.

The thus produced spherical particles composed of inorganic oxides, preferably on the basis of silicon dioxide, have a) a diameter in the range of from 0.01 to 5 mm, preferably 0.02 to 3.5 mm;

b) a specific surface in the range of from 1 to 900 $m^2/g$, preferably 100 to 800 $m^2/g$;

c) an apparent density in the range of from 0.1 to 1.0 g/ml;

d) a pore volume in the range of from 0.25 to 2.5 ml/g;

e) a distribution of the pore diameters with a maximum (monomodal pore distribution) in the range of from 15 to 2,000 Å, preferably 15 to 400 Å.

The specific surface, the pore volume and the pore distribution of these particles may be determined in a manner known per se by means of mercury porosimetry or the receiving and analyzing of nitrogen adsorption curves. The maximum of the pore diameters and the average pore diameter can then be determined from that.

These particles preferably show a monomodal pore distribution in which 80%, preferably 95%, of the pore diameters correspond to the formula $0.8R \leq R \leq 1.2R$, wherein R corresponds to the average pore diameter in the range of from 15 to 400 Å.

In addition to a particularly uniform spherical shape and a close grain spectrum, these particles have a high pore volume with an unusually close distribution of the pore diameters. In this case, it is particularly advantageous that at least 80%, preferably 95%, of the particles have a pore diameter which is in the above-indicated tolerance range of $0.8R \leq R \leq 1.2R$. The fraction of macropores, that is, pores of a diameter of above 200 Å, in this case, is below 5%. These particles therefore have a particularly homogeneous surface which is very advantageous, particularly for their use as a catalyst support. Another special feature of the particles according to the invention is the fact that, while their pore volume is very high, they have a surprisingly high abrasion resistance which, in combination with the high apparent density, makes them particularly suitable for a use as catalysts or catalyst supports in fluidized-bed reactors.

It has been found that particles produced according to the sol-gel process, particularly composed of silicon dioxide and carbon as a filler—in which case the content of silicon dioxide may amount to at least 50% in weight, preferably 55 to 85% in weight—, are suitable for a use as catalyst supports for the catalytic treatment of effluents containing halogen-organic compounds.

According to the invention, catalysts are used which are doped, for example, with noble metals or transition metals and which contain the particles produced according to the above-mentioned process as catalyst supports. They may, for example, contain noble metals, such as gold, silver, platinum, rhodium or palladium, or transition metals, such as copper, preferably palladium. The content of such metals is normally in the range of from 0.1 to 5% in weight relative to the finished catalyst support. Furthermore, metal compounds may also be contained, such as oxides of metals, particularly oxides of transition metals, such as oxides of manganese, iron, nickel or cobalt. Naturally, mixtures of metals, mixtures of metal compounds or mixtures of one or several metals and one or several metal compounds may be applied to the support. For example, the metal constituent of the catalyst may consist of palladium and/or rhodium or of palladium and copper. However, palladium is preferably used as the metal constituent. The manufacturing of the catalyst according to the invention may take place in a manner known per se. For example, metal salts or complex metal compounds may be applied to the particles by means of an impregnating process, a spraying process or a precipitation process and optionally may be reduced after the drying and calcining. The metals are preferably applied to the particles by means of an impregnating process, for example, by means of a solution or suspension of metal salts or complex metal compounds in water or an organic solvent. One advantage of the catalysts obtained on the basis of the particles produced according to the invention is their high abrasion resistance.

For producing palladium-containing supported catalysts, the support is impregnated with an aqueous solution of a soluble palladium compound, with a subsequent drying and calcining. Preferably, the support is first impregnated with an aqueous solution of a palladium compound, is impregnated, dried and calcined and optionally reduced.

According to the invention, the treatment of the effluent may take place by using the noble metal catalyst on a support according to the invention in a fixed bed, a fluidized bed as well as a suspension bed.

In the fixed-bed process, the water is guided through one or more reaction units consisting of the hydrogen gasification vessel and the fixed-bed reactor in which the catalyst is situated.

The system may comprise conventional measuring instruments, such as flow meters, pressure gauges, pH-meters, thermometers.

In order to carry out the process in the fluidized bed or suspension bed, a pressure boosting device is required which is expediently connected with a hydrogen charging apparatus and which guides the water into the fluidized bed or suspension bed reactor in which the support catalyst according to the invention is situated.

The system may, among other apparatuses, have a filtering device, a metering vessel, a pH-meter and a pH-control device and measuring points for determining analytical data of the water.

The following examples have the purpose of explaining but not limiting the invention.

EXAMPLE 1

1 g of a catalyst, whose support material was produced according to this invention and consisted of 60% silicon dioxide and 40% carbon, was situated in a fixed bed reactor. 0.5% in weight Pd were applied to this support material. In this equipment, effluent from the epichlorohydrin synthesis, whose pH-value was adjusted to 4.5, was first saturated with hydrogen and then catalytically dehalogenated at an ambient temperature and a precolumn pressure of 1.5 bar. The flow through the reactor amounted to 100 ml/hr. Before the treatment, the effluent had an AOX-content of 31.6 mg/l; after the treatment, the effluent had an AOX-content of 2 mg/l.

EXAMPLE 2

A stirrer reactor was filled with 300 ml of effluent from the epichlorohydrin synthesis whose pH-value was adjusted to 4.5. 1 g catalyst, whose support material was produced according to this invention, consisted of 60% silicon dioxide and 40% carbon, and had been covered with 1% in weight Pd, was added to the liquid. Hydrogen gas was charged into the solution by means of a G4-frit. The catalytic conversion of the halogen-organic compounds, while they were subjected to stirring, took place at an ambient temperature and a normal pressure. Before the treatment, the effluent had an AOX-content of 24.5 mg/l. After a 2 h reaction time, the effluent had an AOX-content of 1.8 mg/l.

We claim:

1. A process for catalytic treatment of an effluent containing an organic compound, said process comprising contacting said effluent in the presence of hydrogen with a noble metal catalyst supported on a catalyst support, wherein said effluent contains at least one adsorbable organic halogen compound, and wherein said catalyst support contains at least one inorganic oxide and carbon.

2. A process according to claim 1, wherein said effluent further contains inorganic compounds.

3. A process according to claim 1, wherein said at least one inorganic oxide in the catalyst support is selected from the group consisting of oxides of aluminum, magnesium, zirconium, silicon and titanium.

4. A process according to claim 3, wherein said catalyst support comprises a combination of at least two oxides selected from the group consisting of oxides of aluminum, magnesium, zirconium, silicon and titanium.

5. A process according to claim 1, wherein said catalyst support comprises silicon dioxide.

6. A process according to claim 1, wherein said catalyst support comprises at least 50% by weight inorganic oxides.

7. A process according to claim 5, wherein said catalyst support comprises from 55 to 85% by weight inorganic oxides.

8. A process according to claim 1, wherein said noble metal catalyst comprises at least one metal from Group VIII of the Periodic Table of Elements.

9. A process according to claim 8, wherein said catalyst comprises at least one metal selected from the group consisting of platinum, palladium, iridium and rhodium.

10. A process according to claim 9, wherein said catalyst comprises palladium.

11. A process according to claim 1, wherein said catalyst support is a support produced by a sol-gel process.

12. A process according to claim 11, wherein said catlayst support is produced by converting a sol into drop-shaped sol particles by spraying the sol from upwardly into a reaction gas such that droplets of the sol fly along a curved trajectory through the reaction gas and at least partly solidify, collecting the at least partly solidified sol particles in a reaction liquid, and thereafter aging, washing, drying and calcining the collected particles.

13. A process according to claim 1, wherein hydrogen is introduced directly into said effluent prior to contacting the effluent with the supported catalyst.

14. A process according to claim 13, wherein hydrogen is charged into said effluent through a membrane.

15. A process according to claim 1, wherein said effluent has a pH in the range from 3 to 10 and is introduced into at least one reactor containing the supported noble metal catalyst and treated therein at a temperature of from 5° to 80° C. with hydrogen at a pressure of from 1 to 10 bar.

16. A process according to claim 15, wherein said effluent has a pH in the range from 4 to 6 and is treated at a temperature of from 10° to 30° C.

17. A process for catalytic treatment of an effluent containing an organic compound, said process comprising contacting said effluent in the presences of hydrogen with a nobel metal catalyst supported on a catalyst support, wherein said effluent contains at least one adsorbable organic halogen compound, wherein said catalyst support contains at least one inorganic oxide and carbon, and wherein said effluent is effluent from production of epichlorohydrin.

* * * * *